United States Patent [19]

Hashimoto et al.

[11] Patent Number: 5,187,614
[45] Date of Patent: Feb. 16, 1993

[54] WRITE DATA WRITE-PRE-COMPENSATION SYSTEM IN A FLOPPY DISK DRIVE UNIT AND APPARATUS THEREFOR

[75] Inventors: Kunihiro Hashimoto; Chiharu Tsukamoto; Chiharu Kawakubo, all of Iruma, Japan

[73] Assignee: Ye Data Inc., Tokyo, Japan

[21] Appl. No.: 631,678

[22] Filed: Dec. 20, 1990

[30] Foreign Application Priority Data

Dec. 28, 1989 [JP] Japan .................................. 1-338483

[51] Int. Cl.⁵ ............................................. G11B 5/09
[52] U.S. Cl. ..................................................... 360/45
[58] Field of Search ............................. 360/45, 46, 31

[56] References Cited

U.S. PATENT DOCUMENTS 3,067,422 12/1962 Hunt ........................................ 360/48
3,503,059 3/1970 Ambrico ................................. 360/48
4,000,513 12/1976 Precourt ................................ 360/48
4,334,250 6/1982 Theus .................................... 360/48

*Primary Examiner*—Vincent P. Canney
*Attorney, Agent, or Firm*—Wenderoth, Lind & Ponack

[57] ABSTRACT

A write data compensation system compensates original write data which is recorded on recording disc mediums, the original write data to eventually be reproduced using a disc drive apparatus capable of reproducing data from recording media having differing recording densities. In the event that the write data is to be recorded on a low density recording media, the original write data is corrected by displacing each bit for which a bit shift is estimated to occur during reproduction in a direction coincident with a direction of the estimated bit shift. In the event that the write data is to be recorded on a higher density recording media, the original write data is corrected by displacing each bit for which a bit shift is estimated to occur in a direction opposing the direction of the estimated bit shift.

6 Claims, 3 Drawing Sheets

WRITE DATA WRITE-PRE-COMPENSATION SYSTEM IN A FLOPPY DISK DRIVE UNIT AND APPARATUS THEREFOR

BACKGROUND OF THE INVENTION

1. Field of the Invention

The present invention relates to a write-pre-compensation system of write data in a floppy disk drive (FDD) unit and to an apparatus employing such a system.

2. Description of the Related Art

Generally, two types of recording media are available for use in the FDD, high density recording media (having a high memory capacity) denoted 2HD and low density recording media (having a lower memory capacity) denoted 2DD. Also presently available are FDD units (called double-FDD) which use both types recording media.

Furthermore, together with the market demand for even larger memory capacities, double-FDDs which use a recording media having a recording density even higher than that of the 2HD have been put to practical use.

SUMMARY OF THE INVENTION

It is an object of the present invention to provide a system for using not only 2HD and 2DD recording media, but also a plurality of other types of recording media, in other words, a system having compatibility with both high and low memory capacity recording media.

Herein, the word "compatibility" indicates that a 2DD recording medium written using a double-FDD unit can be correctly read when the 2DD recording medium is driven on any other FDD unit, or a 2DD recording medium written by the other FDD unit can be correctly read using the double-FDD unit. (This definition is also applicable to a 2HD recording medium.)

This invention particularly refers to the former case mentioned above, i.e. the write performance of the double-FDD unit to write on a 2DD recording medium.

In the following, the case will be described in which two kinds of recording media, 2HD and 2DD, are used. However, needless to say, the media employed are not limited to 2HD and 2DD.

As is known, the double-FDD unit generally employed at present uses two types of recording media, 2HD and 2DD. However, in the case where recording is made on the low capacity media 2DD, it is technically difficult to achieve compatibility of the 2DD.

Since a thickness of a magnetic layer of the 2HD recording media is different from that of the 2DD recording media (that is, the thickness of the recording media 2HD is 0.8 $\mu$m–0.9 $\mu$m whereas thickness of the 2DD recording media is 1.6 $\mu$m–1.9 $\mu$m), it has been observed that it is difficult to effect recording on a 2DD recording medium using the double-FDD that is similar to recording effected on a 2DD recording medium using a FDD exclusively provided for 2DD recording media.

As the result of a series of studies, the present inventors have discovered an improved recording system for low capacity media in the double-FDD including means for enhancing the reliability, which is herein proposed.

As is known, in the FDD unit in which Write-Pre-Compensation (hereinafter referred to as WPC) is not effected, when a spacing of bits adjacent to each other with respect to one bit (in which write data is present) is different, as shown by waveform $a_o$ in FIG. 1(A), its reproduced waveform $b_o$ produces a so-called peak shift in which an apex is deviated due to a difference in interference of waveforms adjacent to each other. Read data pulses are generated at the zero-cross points of the differentiated reproduced waveform $b_o$ which is depicted in FIG. 1(A) as waveform $c_o$. Read data results as shown by waveform $d_o$ in FIG. 1(A), and thus the write data cannot be properly reproduced.

In the past, in order to prevent the aforesaid peak shift, WPC has been effected in which the direction and amount of the peak shift produced during reproduction are estimated in advance, and the bit position of the write data is deviated in a direction opposite to the direction in which the peak shift is estimated to occur, as shown in FIG. 1(B).

However, when a 2DD recording medium is used for the double-FDD unit to effect recording, since the 2DD recording medium has a thicker magnetic layer than that of the 2HD recording medium as previously described, a surface layer recording results and the resolution is high during reproduction to minimize the peak shift, whilst a saddle portion "f" increases and erroneous recognition data "i" corresponding to the saddle portion "f" occurs.

Accordingly, particularly in the case of the double-FDD unit in which WPC was effected, the reproduced saddle "f" becomes even larger and the erroneous recognition data "i" becomes more conspicuous. Therefore, the reliability is reduced during the use of the 2DD recording medium.

As a method for removing influences caused by the saddle portion, a time domain filter has been heretofore employed. However, this method is not sufficient when a large saddle portion is present.

In view of the foregoing, according to the present invention, the aforementioned problems are overcome by effecting WPC in a direction opposite to that of the prior art, that is, in a direction in which a peak shift occurs, when the low capacity recording media is used, to thereby enhance the reliability when the 2DD recording media is used in the double-FDD unit.

More specifically, in the present invention, as shown by waveform $a_2$ in FIG. 1(C), compensation is effected so that a bit, at which a peak shift of right data occurs, is shifted from a reference position in a direction in which the peak shift occurs to lower the reproduction resolution as shown by waveform $c_2$ in FIG. 1(C), thus preventing an occurrence of erroneous recognition data caused by the saddle portion during the reproduction.

Such a WPC system of the present invention may be applied to either a floppy disk drive controller (FDC) side or to a FDD side.

In the case where a circuit having the WPC function of the present invention is provided on the FDD side, and the FDD is combined with an FDC for outputting write data (FIG. 1, waveform $a_1$) for which the prior art WPC is effected, write data $a_o$ without a pre-shift may be once formed from the write data $a_1$ and thereafter write data $a_2$ may be formed.

DESCRIPTION OF THE PREFERRED EMBODIMENTS

Figure 1:
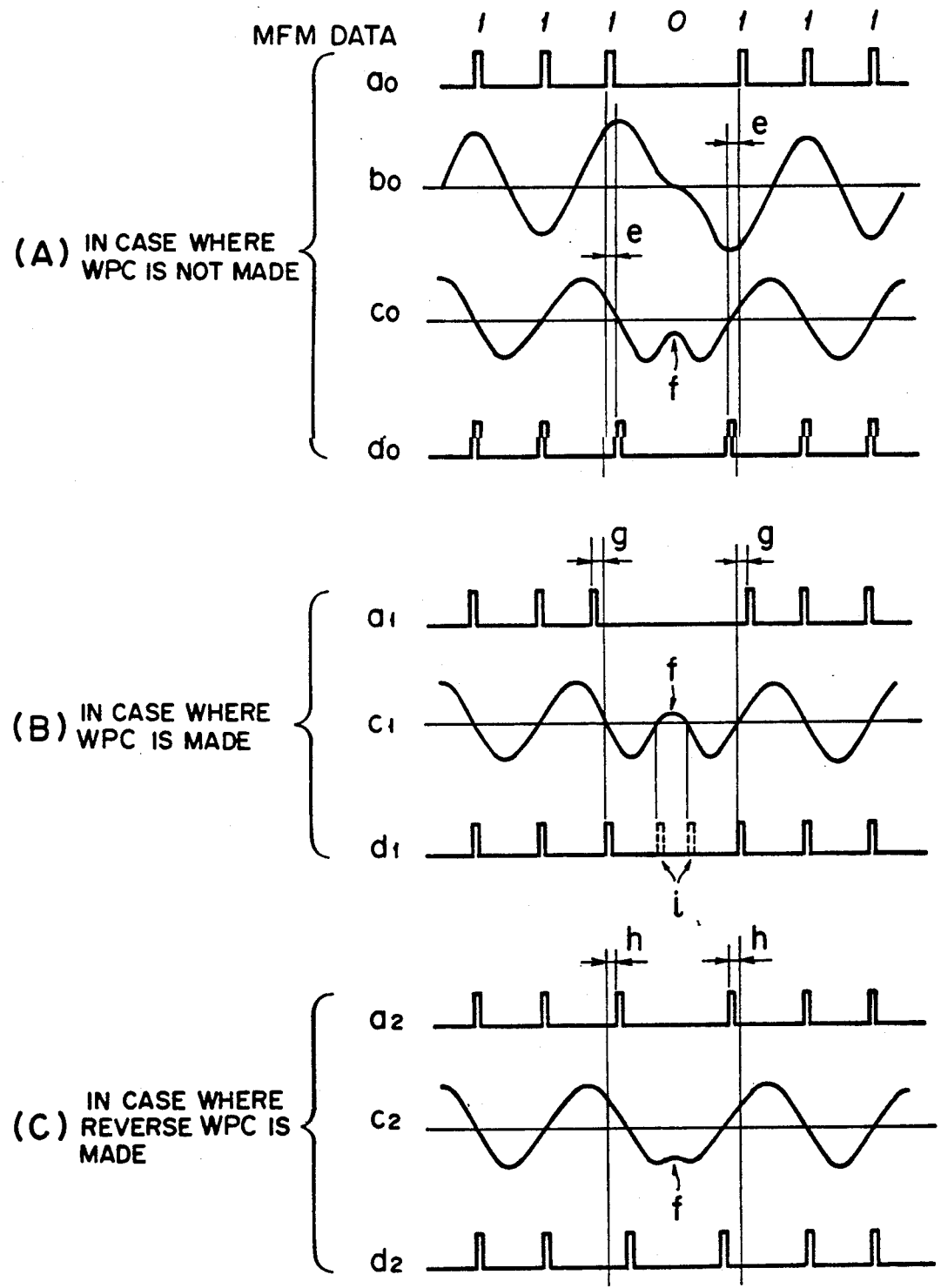
FIG. 1 is a waveform diagram for explaining the principle of the present invention and the difference between the present invention and prior art techniques.
Figure 2:
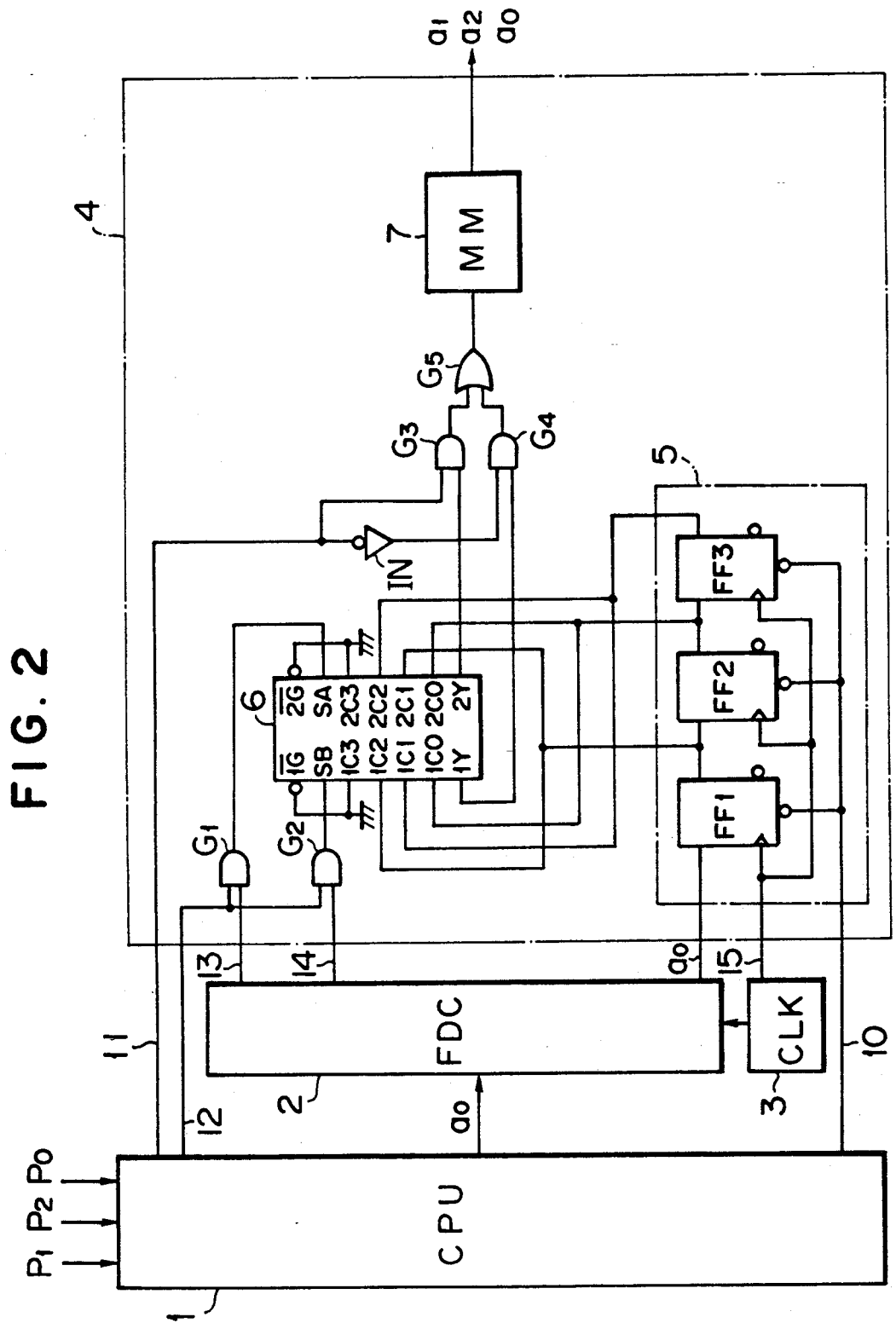
FIG. 2 is a block diagram of an embodiment according to the present invention.

FIG. 2 depicts an embodiment in which the present invention is applied to the FDD unit which uses both 2HD and 2DD recording media.

This embodiment employs both a WPC function according to the present invention and the conventional WPC function, and outputs either write data $a_1$ for 2HD recording media in which WPC is applied in a direction opposite to the direction in which the aforementioned peak shift occurs, or write data $a_2$ for 2DD recording media in which WPC is applied in a direction in which the aforesaid peak shift occurs.

In FIG. 2, reference numeral 1 denotes a CPU employing a microprocessor for generating write data $a_o$, a write gate signal 10, a pre-shift direction setting signal 11 and a WPC application signal 12. The pre-shift direction setting signal 11 is "H" when a 2HD detection signal $P_1$ is input, and "L" when a 2DD detection signal $P_2$ is input.

Reference numeral 2 denotes a FDC for generating, to a WPC circuit 4, write data $a_o$ and pre-shift 0 (PS0) and 1 (PS1) signals 13 and 14 (which designate, together with the WPC application signal 12, whether or not pre-shifting of write data is to occur, and, in case of pre-shifting, the direction thereof). Reference numeral 3 designates a clock pulse generator circuit CLK for generating a clock signal 15 for controlling a timing of shifting operations.

The WPC circuit 4 includes a shift register 5 made up of three flip-flops FF1 to FF3, AND gates $G_1$ to $G_4$, a data multiselector 6, an inverter IN, an OR gate $G_5$, and monostable multivibrator (MM) 7.

The operation of the embodiment will be described hereinafter with reference to the timing chart shown in FIG. 3.

Figure 3:
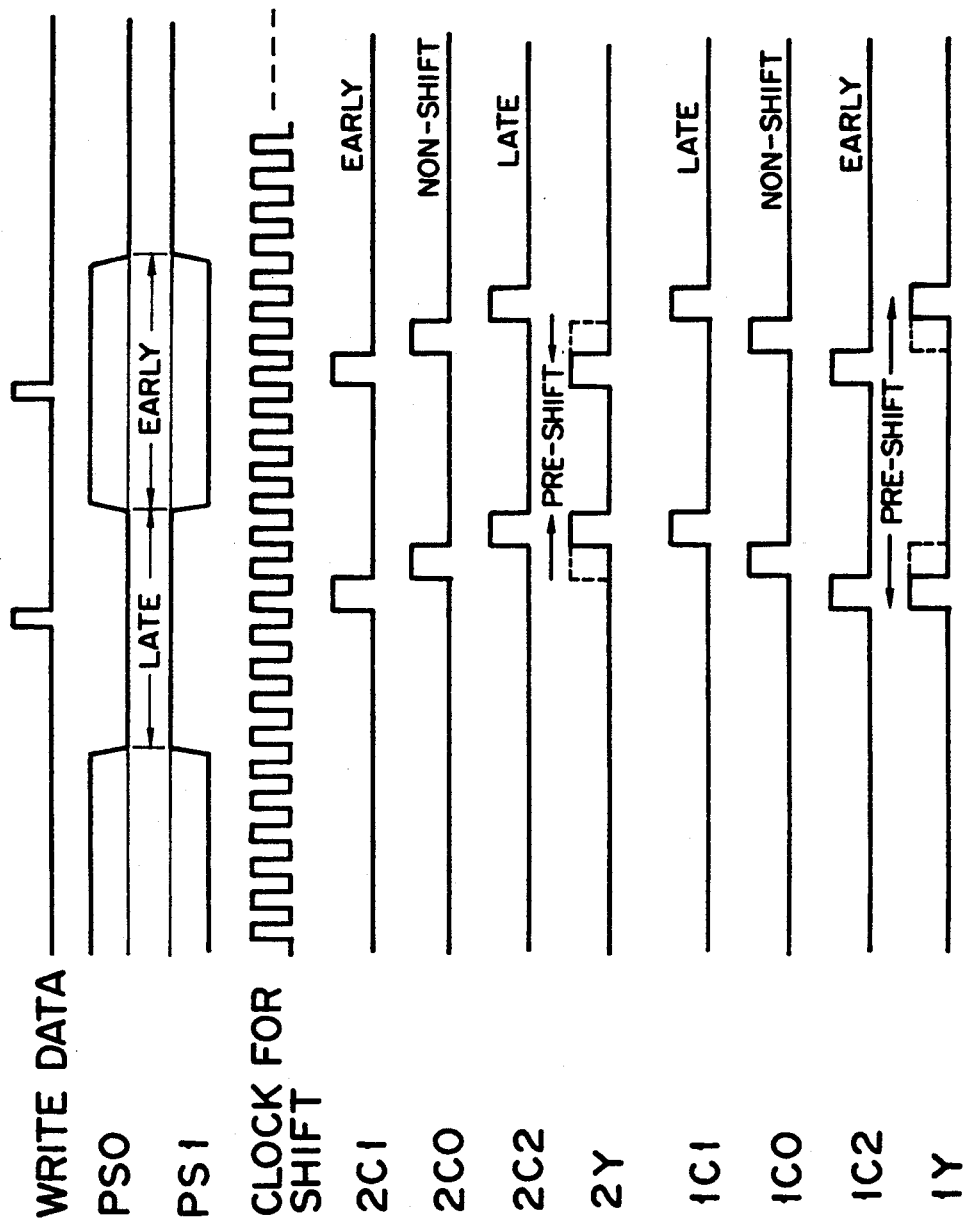
FIG. 3 is a timing chart for explaining the operation of the embodiment shown in FIG. 2.

For a better understanding of the embodiment, in the write data shown in FIG. 3, only bits which are subjected to WPC are depicted.

When a 2HD recording medium is set in the FDD, the detection signal $P_1$ is supplied to the CPU system 1. The CPU 1 sets the pre-shift direction setting signal 11 to "H" and generates the WPC application signal 12, the write data $a_o$ and the write gate signal 10. When the write data $a_o$ generated by the CPU 1 is input to the FDC 2, the FDC 2 outputs the write data $a_o$, the pre-shift 0 signal 13 and the pre-shift 1 signal 14.

The write data $a_o$ output from the FDC 2 is input to the shift register 5 made up of the three flip-flops FF1 to FF3. Pulses which deviate from each other by one clock pulse width, as shown in FIG. 3, are respectively output from the flip-flops FF1 to FF3 and input to terminals (1C2 and 2C1), (1C0 and 2C0), and (1C1 and 2C2) of the data multiselector 6.

On the other hand, AND gate output signals, generated in response to the WPC application signal 12 and the pre-shift signal 13 or the pre-shift signal 14, are applied to terminals SA and SB of the data multiselector 6 to select from among the three input signals of input terminals 1C1, 1C0, 1C2 and 2C1, 2C0, 2C2 according to the combined "H"/"L" state of the pre-shift 0 signal 13 and the pre-shift 1 signal 14. Signals subjected to a pre-shift as shown in FIG. 3 are output from terminals 1Y and 2Y.

It is noted that the shift timing of the shift register 5 can be changed by changing the frequency of the clock signal 15.

Output signals generated in accordance with signals applied to input terminals 1C0 and 2C0 of the data multiselector 6 are non-shifted data, namely, reference write data.

Since the signals input to the data multiselector 6 terminals 1C1, 2C1 and 1C2, 2C2 are reversed in relative shift direction, the data signals output from the data multiselector 6 output terminals 1Y and 2Y have opposed pre-shift directions as shown in FIG. 3.

As previously mentioned, when a 2HD recording medium is used in the FDD, the CPU 1 sets the pre-shift direction setting signal 11 to "H". This "H" signal is applied to the AND gate $G_3$ which therefore outputs a signal of the data multiselector G terminal 2Y, which is in turn output from the WPC circuit 4 via the OR gate $G_5$ and the monostable multivibrator 7.

That is, the write data $a_1$ (i.e. the write data $a_o$ subjected to WPC in a direction opposite to that producing a peak shift) is output from the WPC circuit 4.

Furthermore, in the case where a 2DD recording medium is used in the FDD, the detection signal $P_2$ is input to the CPU 1 which in turn sets the pre-shift direction setting signal 11 to "L". Therefore, the write data 1Y signal of the data multiselector terminal 1Y is output from the WPC circuit 4 via the AND gate $G_4$, OR gate $G_5$ and monostable multivibrator 7.

That is, the write data $a_2$ (i.e. the write data $a_o$ subjected to WPC in a direction producing a peak shift) is output from the WPC circuit 4.

In the case where the write data $a_o$ is not subjected to WPC and is to be output as is, a release signal $P_o$ is applied to the CPU 1 which in turn sets the WPC application signal 12 to "L". Thus, "L" signals are applied to the terminals SA and SB to cause the data multiselector to select signals input to the terminals 1C0 and 2C0. As such, write data $a_o$ which has not been subjected to pre-shifting is output from the WPC circuit 4.

It is noted that the monostable multivibrator 7 is provided to establish a pulse width of the write data.

In the embodiment shown in FIG. 2, the WPC circuit 4 is described as a separate and independent circuit. It is noted, however, that the WPC circuit 4 may actually be incorporated into the LSI-FDC or FDD.

As described above, according to the novel aspect of the present invention, it is possible to provide a FDD using both high and low capacity media.

What is claimed is:

1. A write data compensation system for compensating original write data to be recorded on a low density recording disc medium, comprising means for determining a peak shift of bits of the original write data estimated to occur upon reproduction of the original write data from a disc medium, and means for correcting the original write data by displacing each bit for which a bit shift is estimated to occur in a direction coinciding with a direction of the estimated peak shift, wherein the thus corrected original write data is recorded on the low density recording disc medium.

2. A floppy disc drive unit, comprising the write data compensation system recited in claim 1, for reproducing data from both the low density recording disc medium and higher density recording disc media.

3. A floppy disc controller of a floppy disc drive unit, comprising the write data compensation system recited in claim 1, for reproducing data from both the low density recording disc medium and higher density recording disc media.

4. A write data compensation system for compensating original write data to be recorded on either one of a low density recording disc medium or a high density recording disc medium, comprising:
  means for determining a peak shift of bits of the original write data estimated to occur upon reproduction of the original write data from a disc medium;
  means for correcting the original write data, when the original write data is to be recorded on the low density recording disc medium, by displacing each bit for which a bit shift is estimated to occur in a direction coinciding with a direction of the estimated bit shift, wherein the thus corrected original write data is recorded on the low density recording medium; and,
  means for correcting the original write data, when the original write data is to be recorded on the high density recording disc medium, by displacing each bit for which a bit shift is estimated to occur in a direction opposing the direction of the estimated bit shift, wherein the thus corrected original write data is recorded on the high density recording medium.

5. A floppy disc drive unit, comprising the write back compensation system recited in claim 4, for reproducing data from both the low density recording disc medium and the high density recording disc media.

6. A floppy disc controller of a floppy disc drive unit, comprising the write data compensation system recited in claim 4, for reproducing data from both the low density recording disc medium and the high density recording disc media.

* * * * *